(12) United States Patent
Shumaker et al.

(10) Patent No.: US 12,001,765 B2
(45) Date of Patent: Jun. 4, 2024

(54) TEXTILE-MATERIAL MODEL FOR VIBROACOUSTIC STRUCTURAL SIMULATION

(71) Applicant: Google LLC, Mountain View, CA (US)

(72) Inventors: Laura Charlotte Shumaker, Sebastopol, CA (US); Arun Prakash Raghupathy, Pleasanton, CA (US); Ayyana Mori Chakravartula, Piedmont, CA (US); Darren Torrie, Mountain View, CA (US); Janet P. Ho, San Francisco, CA (US); Liang Cheng, Santa Clara, CA (US); Neha Ravi Dixit, Santa Clara, CA (US); Paul L. Briant, San Carlos, CA (US); Kaitlin S. Spak, Arvada, CO (US); Gunjan Agarwal, Mountain View, CA (US); Daniel Mennitt, Lakewood, CO (US)

(73) Assignee: Google LLC, Mountain View, CA (US)

( * ) Notice: Subject to any disclaimer, the term of this patent is extended or adjusted under 35 U.S.C. 154(b) by 745 days.

(21) Appl. No.: 17/122,180

(22) Filed: Dec. 15, 2020

(65) Prior Publication Data
US 2022/0188475 A1    Jun. 16, 2022

(51) Int. Cl.
*G06F 30/20*    (2020.01)
*G06F 113/12*    (2020.01)
*G10L 25/51*    (2013.01)

(52) U.S. Cl.
CPC ............. *G06F 30/20* (2020.01); *G10L 25/51* (2013.01); *G06F 2113/12* (2020.01)

(58) Field of Classification Search
CPC .. G06F 30/20; G06F 2113/12; G06F 2119/10; G10L 25/51; G01H 17/00;
(Continued)

(56) References Cited

U.S. PATENT DOCUMENTS

2013/0110482 A1\* 5/2013 Ellens ..................... G06F 30/23
703/6
2015/0237711 A1    8/2015 Rogers et al.
2017/0109461 A1\* 4/2017 Dutt ......................... G01N 3/08

FOREIGN PATENT DOCUMENTS

| CN | 109362020 | 9/2020 |
| CN | 113286233 | 8/2021 |
| WO | WO 2021236206 | 11/2021 |

OTHER PUBLICATIONS

Li et al., "Vibrational Simulation Analysis for an Audio System of Automobiles"; 2017 2nd International Conference on System Reliability and Safety (ICSRS); Conference Paper Publisher: IEEE (2017) (Year: 2017).\*

(Continued)

*Primary Examiner* — Steven W Crabb
(74) *Attorney, Agent, or Firm* — Kilpatrick Townsend & Stockton LLP

(57) ABSTRACT

The present document describes techniques associated with a textile-material model for vibroacoustic structural simulation. The techniques described herein provide a nontrivial methodology to test a textile and simplify its representation, which can enable prediction of acoustic performance (e.g., rub and buzz) of an electronic-speaker device having a textile mounted thereon. The textile is modeled as a textile-material model based on an elongation stiffness obtained from a time-temperature superposition curve of the textile, which is based on a dynamic mechanical analysis test of the textile in each of course and wale directions. The textile-material model is then applied to an assembly model of the electronic-speaker device to simulate a vibroacoustic response of the textile relative to the assembly model to predict a likelihood of rub and buzz.

20 Claims, 5 Drawing Sheets

(58) Field of Classification Search
CPC ........ H04R 1/2873; H04R 1/023; H04R 1/20; H04R 29/001; G01N 29/30; G01N 29/4472
See application file for complete search history.

(56) References Cited

OTHER PUBLICATIONS

Oliveira, et al., "Evaluation of Dynamic Mechanical Properties of Fique Fabric/Epoxy Composites", Oct. 14, 2019, 6 pages.
Simuleon, "Material calibration using Abaqus (and Isight)", Nov. 22, 2016, 12 pages.
Fokilidis, T., et al., "Model Set Up and Analysis Tools for Squeak and Rattle in LS-DYNA", In Proceedings of the 14th International LS-DYNA Users Conference, Detroit, MI, US, Jun. 12-14, 2016, pp. 1-12.
International Search Report and Written Opinion dated Mar. 21, 2022 in International Patent Application No. PCT/US2021/063239.

\* cited by examiner

TEXTILE-MATERIAL MODEL FOR VIBROACOUSTIC STRUCTURAL SIMULATION

BACKGROUND

Adjusting a product design to minimize acoustic distortion is a common challenge during development of acoustic devices. One type of acoustic distortion is referred to as "rub and buzz," which may be caused by a variety of different sources in the architecture of the acoustic device. When the root cause of the rub and buzz is an interaction between acoustic energy and a textile mounted on the device, it can be difficult and expensive to resolve. Generally, samples with varying adhesive patterns, underlying plastic grille patterns, and textile strain levels are built and then passed through audio testing in order to determine if one of the designs under trial brings the rub and buzz below an acceptable limit.

As with other techniques, a computer simulation of the device under audio testing may save time, monetary cost, and material. Such a simulation is challenging because textiles often exhibit nonlinear and anisotropic force-elongation behavior, but available audio-simulation software frequently uses a linear solver. A linear solver, however, does not permit the audio simulation software to capture nonlinear behavior, including acoustic distortion, due to material (e.g., textile) or geometric non-linearity. Further, a model of the textile structure down to yarn filaments may be too costly to simulate in terms of computer-processing capability.

SUMMARY

The present document describes a textile-material model for vibroacoustic structural simulation. The techniques described herein provide a nontrivial methodology to test a textile and simplify its representation, which can enable prediction of acoustic performance (e.g., rub and buzz) of an electronic-speaker device (e.g., speaker) having a textile mounted thereon. The textile is modeled using a material model (referred to herein as a "textile-material model") based on an elongation stiffness obtained from a time-temperature superposition curve of the textile, which is based on a dynamic mechanical analysis test of the textile in both course and wale directions. The textile-material model is then applied to an assembly model of the electronic-speaker device to simulate a vibroacoustic response of the textile relative to the assembly model to predict a likelihood of rub and buzz.

In some aspects, a method of modeling a textile material for vibroacoustic structural simulation is disclosed. The method includes determining textile-level properties of a textile swatch and determining, using the textile-level properties, an elongation stiffness of the textile swatch in each of a course direction and a wale direction. The method also includes generating, based on the determined elongation stiffness of the textile swatch, a textile-material model representing a material response of the textile swatch. In addition, the method includes applying the textile-material model to an assembly model representing an electronic-speaker device having one or more audio components and simulating a vibroacoustic response of the textile swatch using the assembly model. The simulating includes applying (i) boundary conditions representing strain on the textile swatch and (ii) force inputs representing audio output by the one or more audio components of the electronic-speaker device. The method further includes identifying, based on the simulated vibroacoustic response, frequencies that cause displacement of the textile swatch relative to surrounding areas sufficient for the textile swatch to vibrationally contact a component of the electronic-speaker device that is proximate to the textile swatch.

In other aspects, a system is disclosed. The system includes a memory and one or more processors. The memory stores computer-executable instructions. The one or more processors are configured to execute the computer-executable instructions to implement a textile-characterization module, a model builder, and a simulation module. The textile-characterization module is configured to provide textile data corresponding to a textile swatch subjected to dynamic mechanical analysis, where the provided textile data is usable to determine an elongation stiffness of the textile swatch in each of a course direction and a wale direction. The model builder is configured to generate, based on the determined elongation stiffness of the textile swatch, a textile-material model representing a material response of the textile swatch. The model builder is also configured to apply the textile-material model to an assembly model representing an electronic-speaker device having one or more audio components. The simulation module is configured to apply boundary conditions representing strain on the textile swatch and apply force inputs representing audio output by the one or more audio components of the electronic-speaker device. Additionally, the simulation module is configured to simulate a vibroacoustic response of the textile swatch applied to the assembly model, where the vibroacoustic response is simulated based on the applied boundary conditions and force inputs. Further, the simulation module is configured to identify, based on the simulated vibroacoustic response, frequencies that cause displacement of the textile swatch relative to surrounding areas sufficient for the textile swatch to vibrationally contact a component of the electronic-speaker device.

In yet other aspects, one or more computer-readable storage media are disclosed, which comprise instructions that, responsive to execution by a processor, implement a system. The simulation system is implemented to determine textile-level properties of a textile swatch, and determine, based on the textile-level properties, an elongation stiffness of the textile swatch in each of a course direction and a wale direction. In addition, the simulation system is implemented to generate, based on the determined elongation stiffness of the textile swatch, a textile-material model representing a material response of the textile swatch. Further, the simulation system is implemented to incorporate the textile-material model onto an assembly model representing an electronic-speaker device having one or more audio components. The simulation is also implemented to simulate a vibroacoustic response of the textile swatch using the assembly model by applying (i) boundary conditions representing strain on the textile swatch and (ii) force inputs representing audio output by the one or more audio components of the electronic-speaker device. A pressure difference across the fabric results from the incident sound, which drives fluid (e.g., air) in and out of the interstices between solid fibers of the fabric. Tests and/or simulation results may help understand and model the relationship between the incident sound on this permeable surface and the resulting force on the fabric. Additionally, the simulation system is implemented to identify, based on the simulated vibroacoustic response, frequencies that cause displacement of the textile swatch relative to surrounding areas sufficient for the textile swatch to vibrationally contact a component of the electronic-speaker device that is proximate to the textile swatch.

This summary is provided to introduce simplified concepts of a textile-material model for vibroacoustic structural simulation, which is further described below in the Detailed Description. This summary is not intended to identify essential features of the claimed subject matter, nor is it intended for use in determining the scope of the claimed subject matter.

BRIEF DESCRIPTION OF THE DRAWINGS

The details of one or more aspects of a textile-material model for vibroacoustic structural simulation are described in this document with reference to the following drawings. The same numbers are used throughout the drawings to reference like features and components.

DETAILED DESCRIPTION

The present document describes a textile-material model for vibroacoustic structural simulation. The techniques described herein provide a nontrivial methodology to test a textile and simplify its representation, which can enable acoustic performance (e.g., rub and buzz) of an electronic-speaker device (e.g., speaker) to be predicted. Such a prediction may be based on a simulation that quantifies a rub-and-buzz risk of mounting a particular textile onto the electronic-speaker device.

In aspects, the prediction can be based on textile mechanical properties obtained from a physical textile sample and used, during the architecture phase of development (e.g., before prototype data is available), to (i) bound allowable textile properties for an electronic-speaker device and (ii) recommend system geometry (e.g., a size of a grille to be used on the device), given a particular textile and electronic-speaker device. In particular, the techniques described herein provide a way to model the textile as it relates to its vibroacoustic properties, integrate the model onto an electronic-speaker device, and analyze the electronic-speaker device (with the textile mounted thereon) using structural-acoustic techniques.

While features and concepts of the described textile-material model for vibroacoustic structural simulation can be implemented in any number of different environments, aspects are described in the context of the following examples.

Example Device

Figure 1:
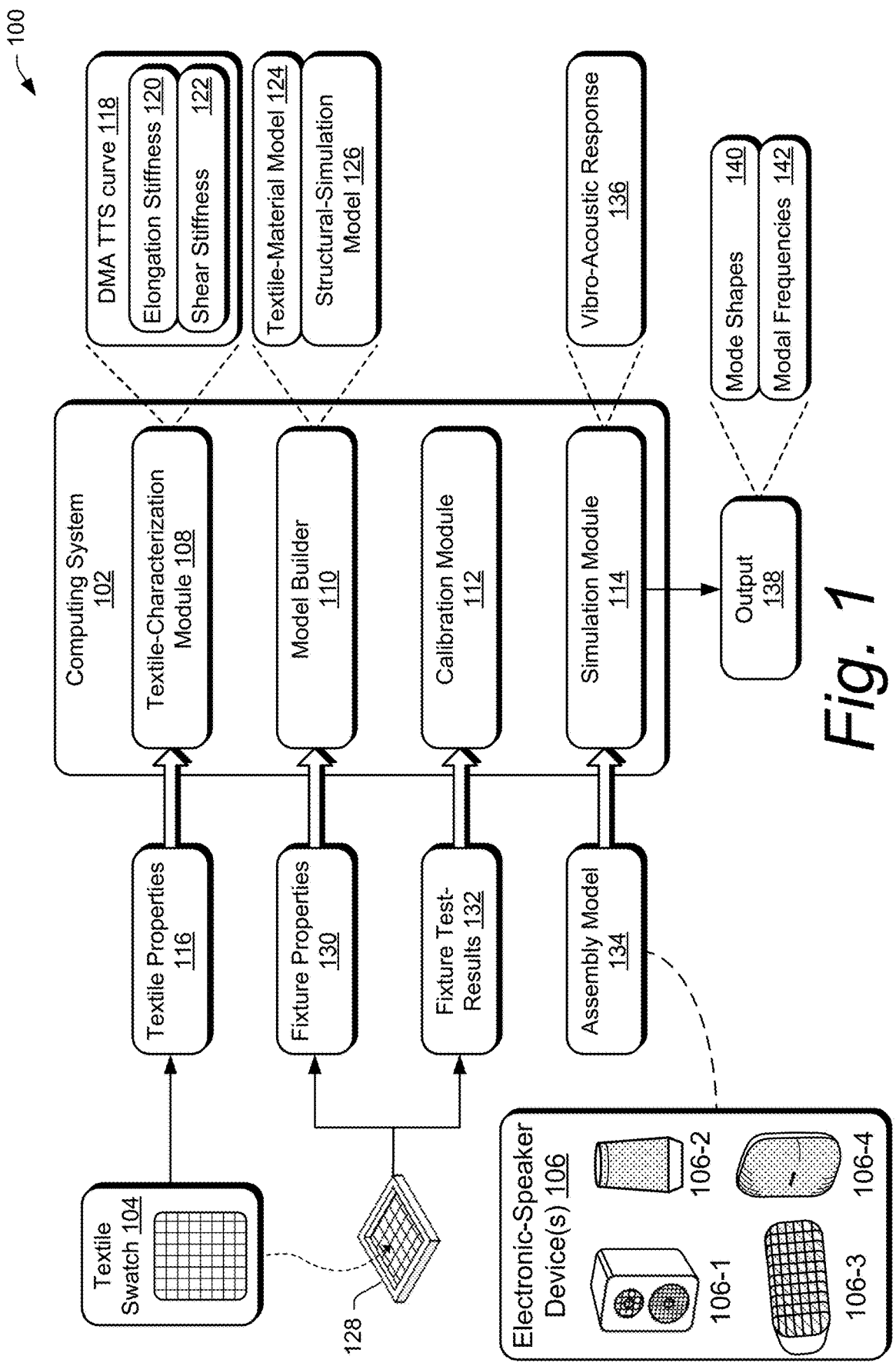
FIG. 1 illustrates an example environment in which a computing system for modeling a textile material for vibroacoustic structural simulation may be implemented.

FIG. 1 illustrates an example environment 100 in which a computing system 102 (also referred to herein as a simulation system) for modeling a textile material (e.g., textile swatch 104 of a textile) for vibroacoustic structural simulation may be implemented. In particular, the computing system 102 builds a model for vibroacoustic structural simulation of the textile material mounted on an audio system (e.g., electronic-speaker device 106). The computing system 102 includes a textile-characterization module 108, a model builder 110, a calibration module 112, and a simulation module 114.

The textile-characterization module 108 may use, as input, textile properties 116 of the textile swatch 104. The textile properties 116 may include any suitable, measurable, or calculable property including, for example, mass, weight, density, thickness, size, and so forth. The textile properties 116 may be based on measurements of the textile swatch 104 or obtained from stored data. Further, the textile properties 116 may include different measurements in different directions, e.g., course direction, wale direction, 45 degree direction. In aspects, the textile swatch 104 may be subjected to dynamic mechanical analysis (DMA) testing. Results of the DMA testing may be used by the textile-characterization module 108, according to a time-temperature superposition (TTS) principle, to generate a curve (e.g., DMA TTS curve 118) of tensile storage modulus E and loss modulus E' versus frequency f. Generally, storage and loss moduli are used for viscoelastic material to measure stored energy (e.g., energy representing an elastic portion of the material) and energy dissipated as heat (e.g., energy representing a viscous portion of the material). Because textiles may exhibit nonlinear and anisotropic force-elongation behavior that has some similarities to that of a viscoelastic material, the DMA TTS curve 118 can be used to extract relevant information corresponding to the textile. For example, the storage modulus E can be used to derive an estimate (e.g., proxy) of elongation stiffness 120 of the textile swatch 104. The DMA testing can be performed, and the resulting DMA TTS curve 118 can be generated, for each of a course direction and a wale direction of the textile swatch 104. In some aspects, a measurement test (e.g., static test) may be performed on the textile swatch 104 to measure a shear stiffness 122, which may be used to determine a shear modulus G. In an example, the DMA testing can be performed, and the resulting DMA TTS curve 118 can be generated, for a 45 degree direction (between the course and wale directions) to determine the shear modulus G.

The model builder 110 may use the elongation stiffness 120, along with the textile properties 116, to generate a textile-material model 124 representing the textile swatch 104. In aspects, the model builder 110 may initialize the textile-material model 124 using any suitable value, including a known or estimate value (e.g., 0.2) for Poisson's ratio v and material properties corresponding to an elastic lamina. The model builder 110 may also generate a structural-simulation model 126 representing the textile swatch secured by a fixture 128. The model builder 110 uses the textile-material model 124 along with fixture properties 130 of the fixture 128 to generate the structural-simulation model 126. The structural-simulation model 126 may be used to calibrate the textile-material model 124 based on a comparison to a physical structural test of the textile swatch 104 secured within the fixture 128.

The fixture 128 may be any suitable fixture capable of securing the textile swatch 104 in an orientation that enables the textile swatch 104 to be subjected to various strain levels and forced excitation. In one example, the fixture 128 may be a drum-head fixture, which secures the textile swatch 104 in a planar orientation and applies varying levels of strain in both course and wale directions. The textile swatch 104 can then be excited with different excitation inputs (e.g., impact force on the frame of the fixture by an object such as an impact hammer, shaking the fixture on a shaker table). A vibration measurement device, such as a laser vibrometer, can be used to scan the excited textile swatch 104 to (i) capture its operating deflection shapes and resonant frequencies as experimental data and (ii) provide the experimental data to the calibration module 112 as fixture-test results 132.

The simulation module 114 can run a simulation of the structural-simulation model 126 to generate simulated data, including simulated mode shapes and modal frequencies corresponding to the textile-material model 124 of the textile swatch 104. The calibration module 112 may compare the simulated data with the experimental data included in the fixture-test results 132. If discrepancies exist between the simulated data and the experimental data, the calibration module 112 may tune the textile-material model 124 by adjusting one or more parameters of the textile-material model 124 for model convergence with the physical test of the textile swatch 104. Example parameters that may be adjusted include the Poisson's ratio v and shear modulus G. Additionally, the storage modulus E may be adjusted until the modal frequencies substantially align with or correlate to the fixture-test results 132 for strains of interest on the electronic-speaker device 106 (e.g., strains where the textile's elongation behavior is substantially linear). The overall representation of the structural-simulation model 126 may also be evaluated via boundary conditions and local effects for further tuning.

The simulation module 114 may also apply the textile-material model 124 to an assembly model 134 representing an electronic-speaker device (e.g., electronic-speaker device 106) having one or more audio components (e.g., speaker module, speaker driver). The electronic-speaker device 106 may include any suitable acoustic device configured to have a textile mounted thereon. Example electronic-speaker devices may include speaker 106-1, speaker 106-2, speaker 106-3, and speaker 106-4. The simulation module 114 applies forced excitation to the assembly model 134 (with the applied textile-material model 124) to simulate a vibroacoustic response 136 of the textile swatch 104. Based on the simulation, the simulation module 114 provides an output 138, which includes predicted or simulated mode shapes 140 and corresponding modal frequencies 142.

Figure 2:
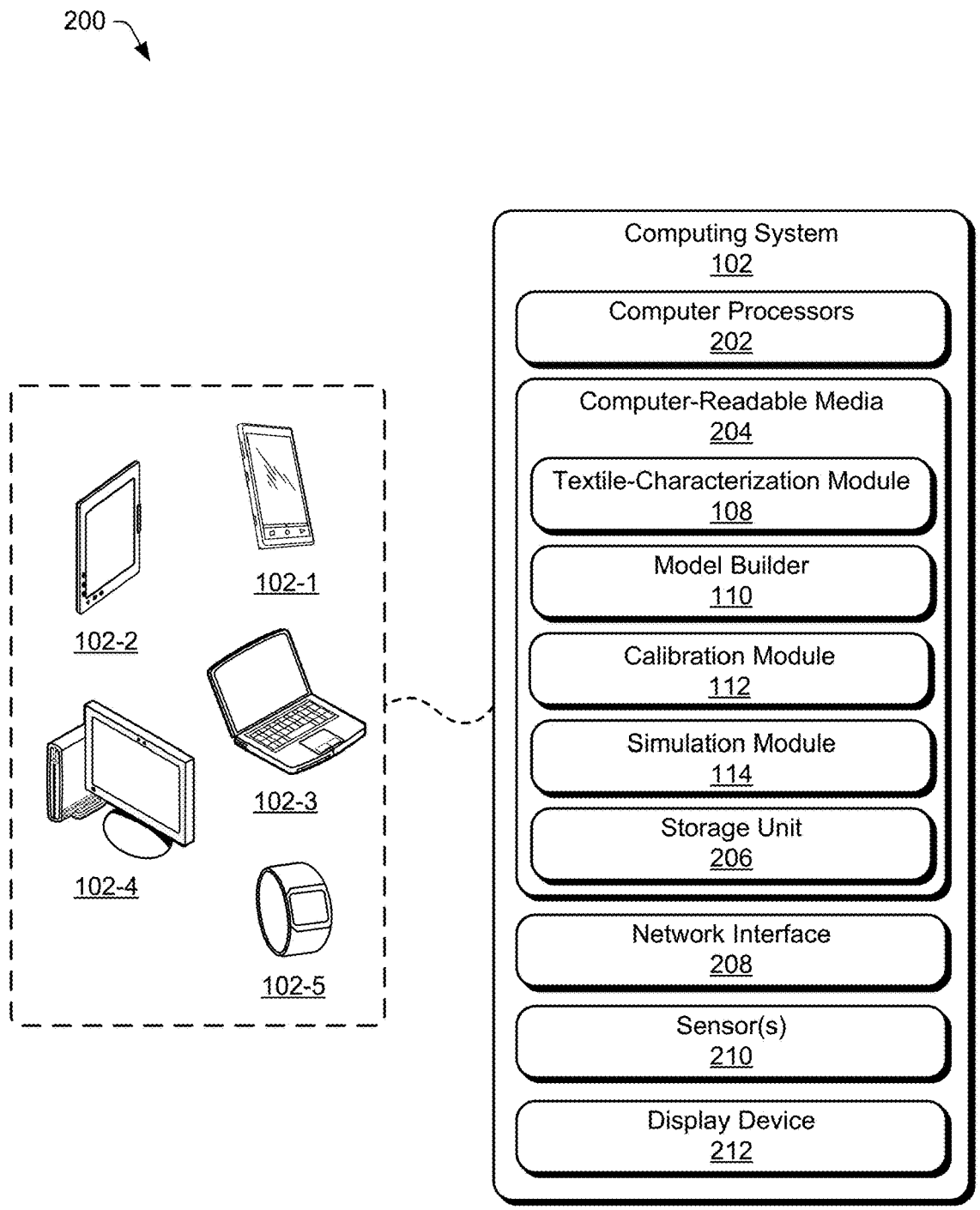
FIG. 2 illustrates an example implementation of the computing system of FIG. 1 in more detail.

In more detail, consider FIG. 2, which illustrates an example implementation 200 of the computing system 102 of FIG. 1 in more detail. The computing system 102 of FIG. 2 is illustrated as a variety of example devices, including a smartphone 102-1, a tablet 102-2, a laptop 102-3, a desktop computer 102-4, and a computing watch 102-5 (e.g., smartwatch). The computing system 102 can also include other devices, such as televisions, entertainment systems, audio systems, gaming systems, track pads, drawing pads, netbooks, and e-readers. Note that the computing system 102 can be wearable, non-wearable but mobile, or relatively immobile (e.g., desktops and appliances).

The computing system 102 also includes one or more computer processors 202 and one or more computer-readable media 204, which includes memory media and storage media. Applications and/or an operating system (not shown) implemented as computer-readable instructions on the computer-readable media 204 can be executed by the computer processors 202 to provide some or all of the functionalities described herein. For example, the computer-readable media 204 can include the textile-characterization module 108, the model builder 110, the calibration module 112, and the simulation module 114.

The computer-readable media 204 also includes volatile and/or non-volatile memory, such as a storage unit 206. In aspects, the storage unit can be used to store models (e.g., the textile-material model 124, the structural-simulation model 126, and/or the assembly model 134 from FIG. 1) and other data (e.g., the textile properties 116, the fixture properties 130, the fixture-test results 132, the DMA TTS curve 118, and simulation data such as the vibroacoustic response 136).

The computing system 102 may also include a network interface 208. The computing system 102 can use the network interface 208 for communicating data over wired, wireless, or optical networks. By way of example and not limitation, the network interface 208 may communicate data over a local-area-network (LAN), a wireless local-area-network (WLAN), a personal-area-network (PAN), a wide-area-network (WAN), an intranet, the Internet, a peer-to-peer network, point-to-point network, or a mesh network.

The computing system 102 may also include one or more sensors 210. The sensors 210 can include any of a variety of sensors, such as an audio sensor (e.g., a microphone), a touch-input sensor (e.g., a touchscreen), an image-capture device (e.g., a camera or video-camera), accelerometers, proximity sensors (e.g., capacitive sensors), an ambient light sensor (e.g., photodetector), or a haptic sensor (e.g., piezoelectric actuators, eccentric rotating mass (ERM) actuators, linear resonant actuators (LRA)). In aspects, the sensors 210 may be connected to a fixture (e.g., the fixture 128) to detect information corresponding to the textile swatch 104 under different levels of strain, usable for generating the DMA TTS curve 118. In another example, the sensors 210 may be connected to the fixture 128 and/or a laser vibrometer (not shown) for detecting the operational deflection shapes and resonant frequencies of the textile swatch 104 under varying levels of strain and forced excitation.

The computing system 102 can also include a display device, such as the display device 212. The display device 212 can include any suitable display device, such as a touchscreen, a liquid crystal display (LCD), thin film transistor (TFT) LCD, an in-place switching (IPS) LCD, a capacitive touchscreen display, an organic light-emitting diode (OLED) display, an active-matrix organic light-emitting diode (AMOLED) display, super AMOLED display, and so forth.

These and other capabilities and configurations, as well as ways in which entities of FIG. 1 act and interact, are set forth in greater detail below. These entities may be further divided, combined, and so on. The computing system 102 of FIG. 1 and the detailed illustrations of FIG. 2 through FIG. 5 illustrate some of many possible environments and devices capable of employing the described techniques.

Example Methods

Figure 3:
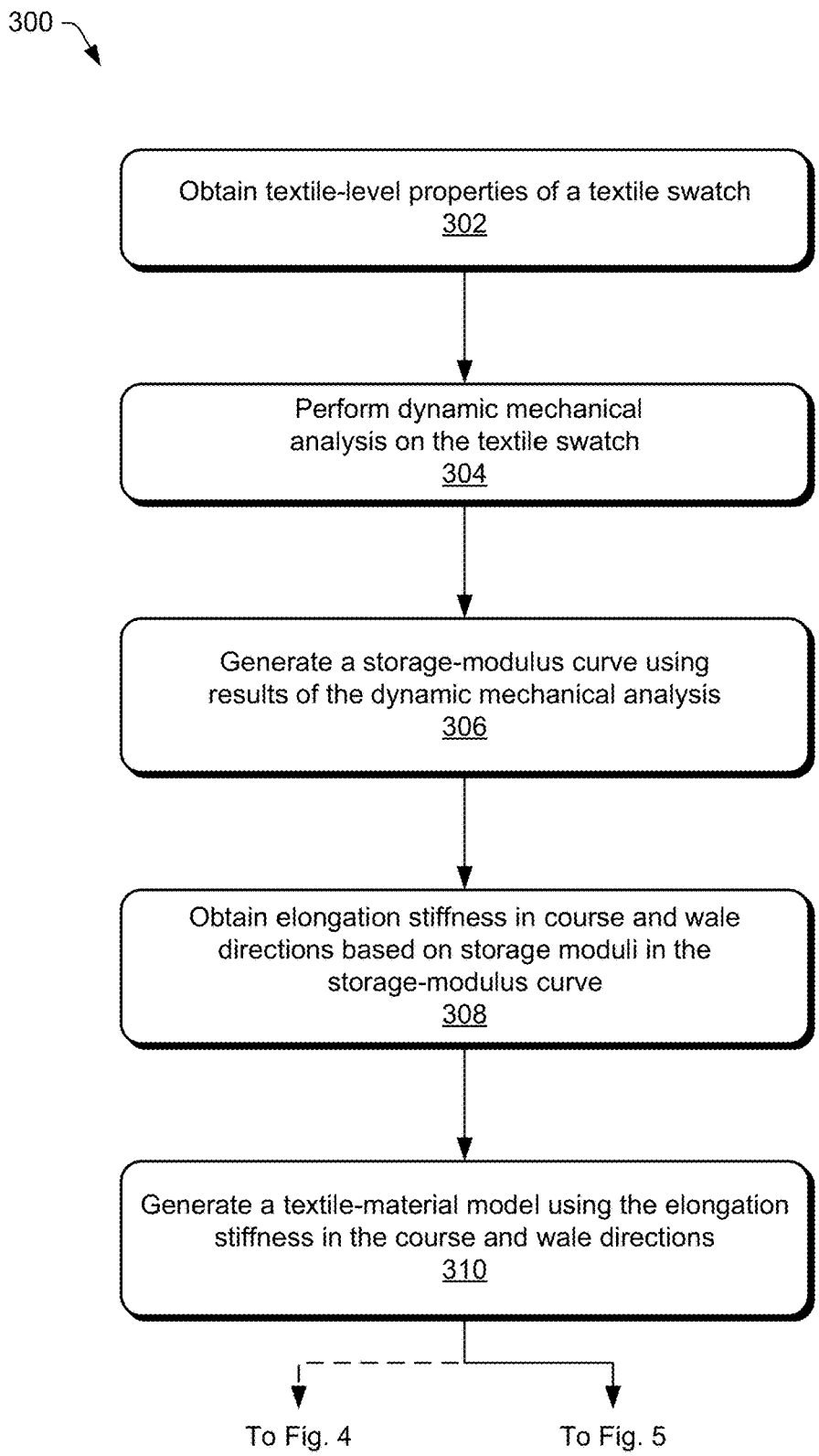
FIG. 3 depicts a method for characterizing and modeling a textile for vibroacoustic structural simulation.
Figure 4:
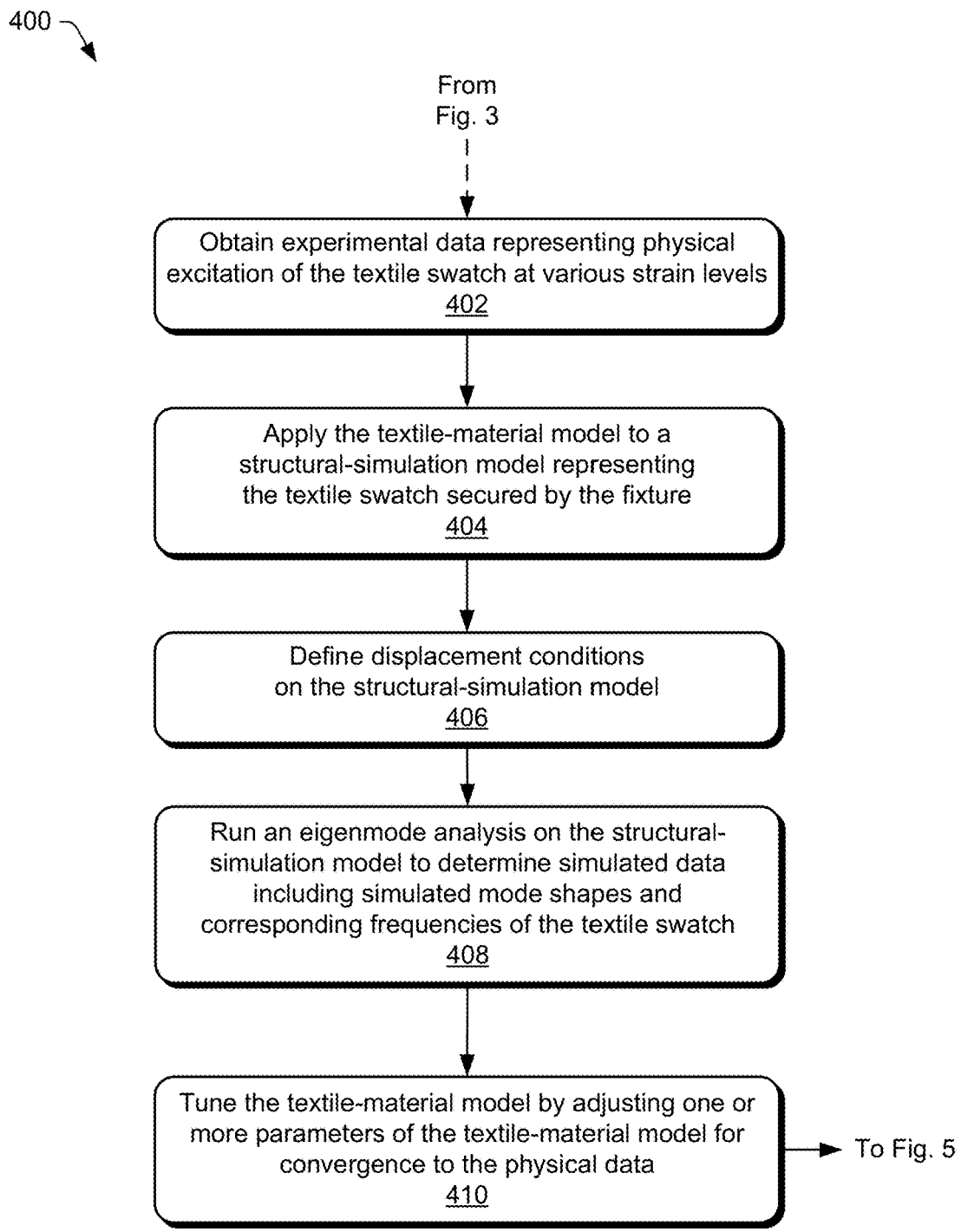
FIG. 4 depicts a method for calibrating a textile model usable for vibroacoustic structural simulation and is optionally continued from the method of FIG. 3.
Figure 5:
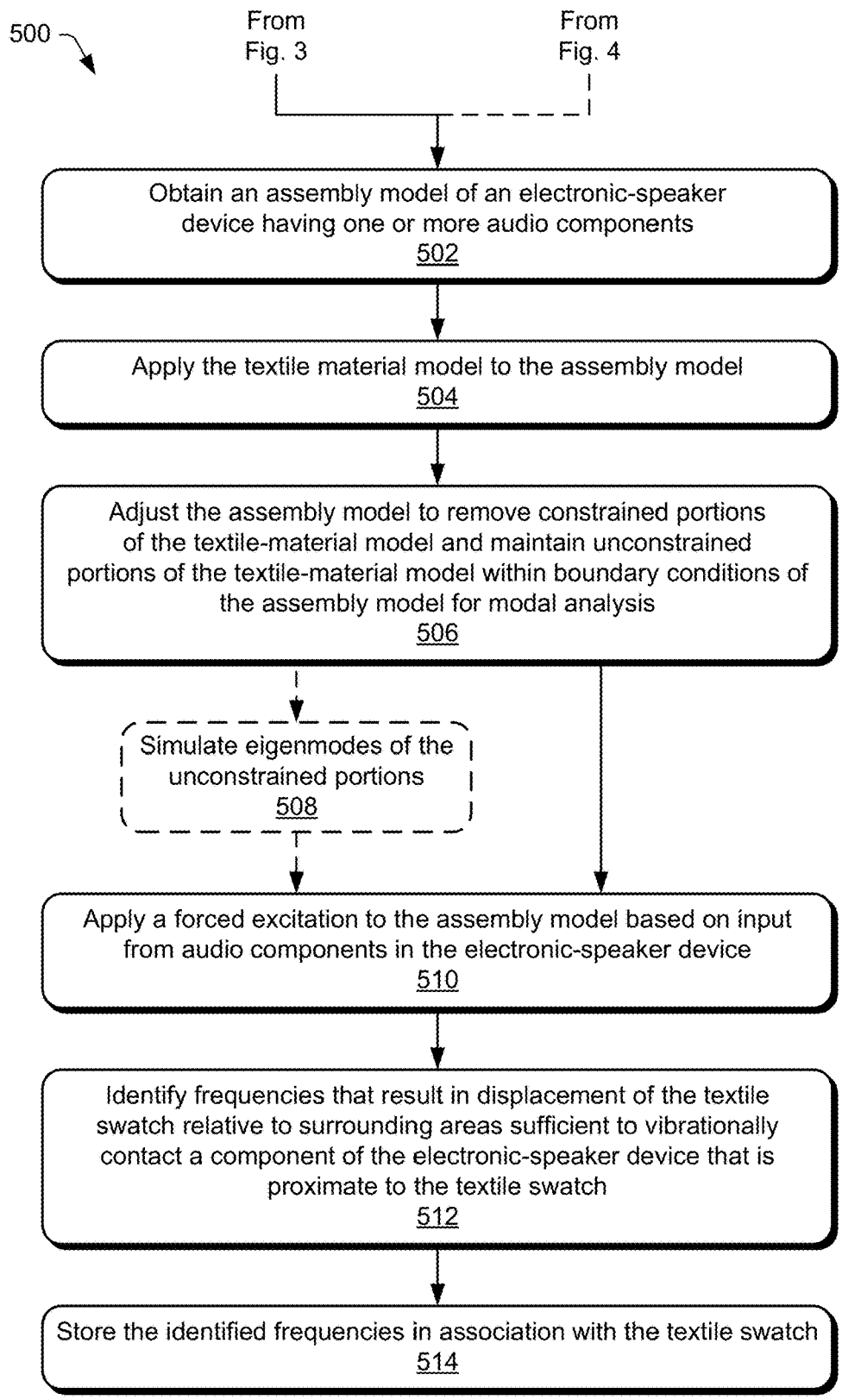
FIG. 5 depicts a method for performing a vibroacoustic structural simulation of a textile assembled onto an electronic-speaker device and may be continued from either the method of FIG. 3 or the method of FIG. 4.

FIGS. 3-5 depict methods 300, 400, and 500, respectively, for modeling a textile for vibroacoustic structural simulation. The methods 300, 400, and 500 are shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example environment 100 of FIG. 1 or to components of the computing system as detailed in FIG. 2, reference to which is made for example only. The techniques are not limited to performance by one entity or multiple entities operating on one device.

FIG. 3 depicts a method 300 for characterizing and modeling a textile for vibroacoustic structural simulation. FIG. 4 depicts a method 400 for calibrating a textile model usable for vibroacoustic structural simulation and is optionally continued from the method 300 of FIG. 3. FIG. 5 depicts a method 500 for performing a vibroacoustic structural simulation of a textile assembled onto an electronic-speaker device and may be continued from either the method 300 of FIG. 3 or the method 400 of FIG. 4.

In FIG. 3, at 302, textile-level properties of a textile swatch are obtained. Example textile properties 116 of the textile swatch 104 that may be obtained include weight, density, thickness, and so forth. The textile properties 116 may be measured directly from the textile swatch 104 and input into the computing system 102. Alternatively, the textile properties 116 may be obtained from data previously stored in a memory (e.g., the storage unit 206 from FIG. 2). The textile swatch 104 is a sample of a textile configured to be mounted onto an electronic-speaker device (e.g., the electronic-speaker device 106).

At 304, dynamic mechanical analysis (DMA) is performed on the textile swatch. For example, the textile swatch 104 may be secured in a fixture (e.g., tensioning machine) and subjected to DMA testing. An example of DMA testing includes applying a sinusoidal load or displacement to the textile swatch 104 and concurrently measuring the resulting force or displacement. The temperature and frequency and/or magnitude of the input load or displacement may be varied. The textile swatch 104 is tested and measured in both course and wale directions as well as in the 45 degree direction.

At 306, a storage modulus curve is generated. For example, using the time-temperature superposition principle of linear viscoelasticity, the textile-characterization module 108 can generate a curve (e.g., DMA TTS curve 118) representing storage and loss moduli versus frequency for the textile swatch 104.

At 308, elongation stiffness is obtained in course and wale directions based on storage moduli in the storage modulus curve. For example, the storage modulus in the DMA TTS curve 118 at a particular frequency range (e.g., approximately 100 Hz to approximately 1 kHz) can be extracted and used as a proxy for the elongation stiffness 120 of the textile swatch 104 in the course direction and/or the wale direction, provided the storage modulus is substantially flat over the particular frequency range. For verification purposes, force-elongation curves of the textile swatch 104 along course, wale, and 45-degree directions can be mechanically measured and compared to data points on the generated curve. In some instances, the textile swatch 104, for a corresponding textile, may be unavailable, but the techniques described herein may be used to characterize and model the corresponding textile.

At 310, a textile-material model is generated using the elongation stiffness in each of the course and wale directions. For example, the model builder 110 can use, as input, the elongation stiffness 120 of the textile swatch 104 in each of course and wale directions, as obtained from the DMA TTS curve 118, along with textile properties 116 (e.g., mass, density, thickness, damping, shear modulus) of the textile swatch 104 to build a model of the textile. In some instances, the model builder 110 can use any suitable value, including known or estimated initial value (e.g., 0.2) for Poisson's ratio v. As mentioned, the model builder 110 can also use, as input, the shear stiffness 122 of the textile swatch 104 corresponding to a 45 degree direction. The shear stiffness 122 can be used to determine the shear modulus of the textile swatch 104 for building the model of the textile.

After generating the textile-material model, the method 300 may optionally continue to FIG. 4 for model calibration. Alternatively, the method 300 may continue directly to FIG. 5 for vibroacoustic structural simulation.

Continuing with FIG. 4, at 402, the calibration module obtains experimental data representing physical excitation of the textile swatch at various strain levels. For example, the textile swatch 104 may be secured in a fixture (e.g., fixture 128 in FIG. 1), which can secure the textile swatch 104 in a planar orientation according to boundary conditions of the fixture. The textile swatch 104, in the fixture 128, is excited with a force. Any suitable force can be used, including an impact force (on the textile swatch 104 or on the fixture 128) or sinusoidal movement (e.g., shaking) of the textile swatch 104. A vibration measurement device (e.g., laser vibrometer) is then used to capture or scan operating deflection shapes of the textile swatch 104 at frequencies of interest under forced excitation. The operating deflection shapes can provide a visual representation of locations of peaks and valleys on the textile swatch 104 at particular frequencies and within the boundary conditions of the fixture 128. The captured operating deflection shapes and associated resonant frequencies are then provided as experimental data in the fixture-test results 132 to the calibration module 112.

At 404, the textile-material model is applied to a structural-material model representing the textile swatch secured by the fixture. For example, the model builder 110 applies the textile-material model 124 to the structural-simulation model 126 representing the textile swatch 104 secured by the fixture 128. As part of the structural-simulation model 126, the fixture 128 is modeled as a rigid body.

At 406, displacement conditions are defined on the structural-simulation model. For example, the simulation module 114 can apply strain to the textile-material model 124 by defining displacement conditions of the structural-simulation model 126. The displacement conditions are initial boundary conditions on the model of the fixture 128 in the structural-simulation model 126.

At 408, an eigenmode analysis is run on the structural-simulation model to determine mode shapes and corresponding modal frequencies of the textile swatch. For example, the simulation module 114 or the calibration module 112 may run the eigenmode analysis on the structural-simulation model 126 (e.g., the model of the fixture 128 securing the model of textile swatch 104) to provide simulated data, including simulated mode shapes and modal frequencies of the textile-material model 124.

At 410, the calibration module tunes the textile-material model by adjusting one or more parameters of the textile-material model for model convergence of the simulated data to the experimental data. In an example, the calibration module 112 tunes the textile-material model 124 by first comparing the simulated data to the experimental data. In some instances, the calibration module 112 may adjust the shear modulus for model convergence. In aspects, the storage moduli for both course and wale directions can also be adjusted. One or more of these parameters may be adjusted along with a representation of fabric-to-fixture constraints in the model (e.g., boundary conditions) until the modal frequencies of the simulated data substantially correlate (within a given tolerance) to the experimental data for strains of interest on the electronic-speaker device 106 (e.g., strains where the elongation behavior of the textile swatch 104 on the DMA TTS curve 118 is substantially linear).

Continuing in FIG. 5, at 502, an assembly model of an electronic-speaker device having one or more audio components is obtained. For example, the simulation module 114 may obtain the assembly model 134, which is a model of the electronic-speaker device 106.

At 504, the textile-material model is applied to the assembly model. For example, the simulation module 114 applies the textile-material model 124 to the assembly model 134 to represent the textile-material model 124 mounted on the electronic-speaker device 106. In aspects, the textile-material model 124 may be mounted over a grille or a speaker driver of the electronic-speaker device 106.

At 506, the assembly model is adjusted to remove constrained portions of the textile-material model and maintain unconstrained portions of the textile-material model within boundary conditions of the assembly model for modal analysis. For example, the simulation module 114 can remove areas of the textile-material model 124 that are constrained by adhesive or other components when mounted on the electronic-speaker device 106. In this way, only unconstrained portions (e.g., free areas) remain for analysis, where the unconstrained portions include areas of the textile-material model 124 that (i) are not constrained by adhesive or other components of the electronic-speaker device 106 and (ii) are movable based on structural vibration or incident sound. The unconstrained portions are modeled as solid bodies, membranes, or shells, with appropriate thickness (either a nominally measured thickness or thickness measured in assembly). Further, edges of the unconstrained portions of the textile-material model 124 (e.g., edges where the constrained portions were removed) are configured to match locations where the adhesive constrains the textile in a physical assembly of the textile on the electronic-speaker device 106.

Optionally, at 508, eigenmodes of the unconstrained portions of the textile-material model are simulated without other components of the assembly model. For example, for calibration purposes, an eigenmode analysis is run on the unconstrained portions of the textile-material model 124 alone to simulate corresponding mode shapes and modal frequencies. Resulting mode shapes and modal frequencies can be compared to the simulated data produced at 408 of FIG. 4 for the structural-simulation model 126. Such a comparison can be used to verify the model of the unconstrained portions of the textile-material model 124. In another example, the resulting mode shapes and modal frequencies can be verified against vibration-response data measured from the textile swatch 104 based on exposure of the textile swatch 104 to multiple levels of strain and forced excitation (e.g., the experimental data obtained at 402 in FIG. 4).

At 510, a forced excitation is applied to the assembly model based on input from audio components in the electronic-speaker device. In an example, the simulation module 114 simulates the vibroacoustic response 136 of the textile swatch 104 using the assembly model 134. To simulate the vibroacoustic response 136, the simulation module 114 first applies boundary conditions representing strain on the textile swatch 104. Then, the simulation module 114 applies force inputs representing audio output by the audio components of the electronic-speaker device 106.

At 512, frequencies are identified that result in a displacement of the textile swatch relative to surrounding areas sufficient for the textile swatch to vibrationally contact a component of the electronic-speaker device proximate to the textile swatch. In aspects, the simulation module 114 identifies (or provides the output 138 usable to identify), based on the simulated vibroacoustic response 136, frequencies (e.g., the modal frequencies 142) and mode shapes (e.g., the mode shapes 140) that cause an interaction between the textile and parts of the electronic-speaker device 106 including the grille, where such interaction may result in rub and buzz. In some instances, the identified frequencies are those associated with the highest relative displacement of the unconstrained portions relative to an adjacent part of the electronic-speaker device 106.

At 514, the identified frequencies are stored in associated with the textile swatch. For example, the identified frequencies can be stored in the storage unit 206 on the computing system 102. Alternatively, the identified frequencies can be stored in remote storage.

If any part of the unconstrained portions of the textile vibrationally contacts another component of the electronic-speaker device 106, there is a high likelihood of rub and buzz occurring. In an example, if the displacement of the textile swatch 104, relative to an adjacent component(s) of the electronic-speaker device 106, is greater than a threshold, then an associated level of risk of rub and buzz can be determined. The risk may be based on the identified frequency (if such frequency is in a desired frequency range for the audio output of the electronic-speaker device), the location of the peaks and valleys in the mode shape corresponding to the identified frequency (if the peak/valley location results in physical contact between the textile and another component of the electronic-speaker device 106), or vibrational effects of the textile that may produce sound by interacting with air. The simulation module 114 may identify frequencies that result in the displacement of the textile swatch 104, which is relative to adjacent components of the assembly model 134 and is greater than a threshold, to determine the risk of rub and buzz.

By adjusting adhesive locations, textile strain, and/or the textile properties 116 and using the described techniques, a developer can identify which parameters reduce relative movement between the unconstrained portions of the textile and other parts of a product assembly (e.g., the electronic-speaker device 106). Accordingly, the developer can use the described techniques in the design phase to predict where rub and buzz is likely to occur on a particular electronic-speaker device, prior to constructing the device, which may significantly reduce costs associated with product development.

CONCLUSION

Although aspects of the textile-material model for vibroacoustic structural simulation have been described in language specific to features and/or methods, the subject of the appended claims is not necessarily limited to the specific features or methods described. Rather, the specific features and methods are disclosed as example implementations of the textile-material model for vibroacoustic structural simulation, and other equivalent features and methods are intended to be within the scope of the appended claims. Further, various different aspects are described, and it is to be appreciated that each described aspect can be implemented independently or in connection with one or more other described aspects.

What is claimed is:
1. A method of modeling a textile material for vibroacoustic structural simulation, the method comprising:
   determining textile-level properties of a textile swatch;

determining, using the textile-level properties, an elongation stiffness of the textile swatch in each of a course direction and a wale direction;
generating, based on the determined elongation stiffness of the textile swatch, a textile-material model of the textile swatch;
applying the textile-material model to an assembly model representing an electronic-speaker device having one or more audio components;
simulating a vibroacoustic response of the textile swatch using the assembly model, the simulating including applying:
  boundary conditions representing strain on the textile swatch; and
  force inputs representing audio output by the one or more audio components of the electronic-speaker device; and
identifying, based on the simulated vibroacoustic response, frequencies that cause displacement of the textile swatch relative to surrounding areas sufficient for the textile swatch to vibrationally contact a component of the electronic-speaker device that is proximate to the textile swatch.

2. The method of claim 1, further comprising:
performing dynamic mechanical analysis on the textile swatch; and
generating a time-temperature superposition (TTS) curve based on results of the dynamic mechanical analysis, wherein the TTS curve includes storage moduli and corresponding frequencies usable to determine the elongation stiffness of the textile swatch.

3. The method of claim 1, wherein generating the textile-material model includes generating the textile-material model as an elastic lamina.

4. The method of claim 1, further comprising:
securing the textile swatch in a fixture; and
determining mode shapes and corresponding modal frequencies of the textile swatch by:
  applying forced excitation to the textile swatch at multiple strain levels; and
  using a laser vibrometer to scan the textile swatch during the forced excitation and provide experimental data including operating deflection shapes and resonant frequencies.

5. The method of claim 4, wherein the fixture includes a drum-head fixture configured to:
secure the textile swatch in a planar orientation; and
apply various levels of strain to the textile swatch in the course direction and the wale direction.

6. The method of claim 4, further comprising:
applying the textile-material model to a structural-simulation model to represent the textile swatch secured by the fixture;
applying strain to the textile-material model by defining displacement conditions of the structural-simulation model;
running an eigenmode analysis on the structural-simulation model to provide simulated data including simulated mode shapes and modal frequencies; and
tuning the textile-material model by adjusting one or more parameters of the textile-material model for model convergence of the simulated data to the experimental data.

7. The method of claim 6, wherein adjusting the one or more parameters of the textile-material model includes adjusting at least one of a Poisson's ratio, a shear modulus, or a storage modulus.

8. The method of claim 1, wherein:
applying the textile-material model to the assembly model provides a representation of the textile swatch mounted on the electronic-speaker device; and
the method further comprises adjusting the assembly model to remove constrained portions of the textile-material model and maintain unconstrained portions of the textile-material model within boundary conditions of the assembly model for modal analysis.

9. The method of claim 8, wherein the identifying includes identifying frequencies associated with a highest relative displacement of the unconstrained portions of the textile swatch relative to the component of the electronic-speaker device.

10. The method of claim 8, wherein the unconstrained portions of the textile-material model are modeled as solid bodies, membranes, or shells.

11. The method of claim 8, wherein the unconstrained portions of the textile-material model represent portions of the textile swatch that are movable based on structural vibration or incident sound.

12. The method of claim 8, wherein the constrained portions of the textile-material model represent portions of the textile swatch that are constrained by adhesive or other components of the electronic-speaker device.

13. The method of claim 8, further comprising:
simulating eigenmodes of the unconstrained portions of the textile-material model without other components of the assembly model; and
verifying the simulated eigenmodes of the unconstrained portions of the textile-material model against vibration-response data determined from the textile swatch based on exposure of the textile swatch to multiple levels of strain and forced excitation.

14. A system comprising:
a memory storing computer-executable instructions; and
one or more processors configured to execute the computer-executable instructions to implement:
  a textile-characterization module configured to provide textile data corresponding to a textile swatch subjected to dynamic mechanical analysis, the provided textile data usable to determine of an elongation stiffness of the textile swatch in each of a course direction and a wale direction;
  a model builder configured to:
    generate, based on the determined elongation stiffness of the textile swatch, a textile-material model of the textile swatch; and
    apply the textile-material model to an assembly model representing an electronic-speaker device having one or more audio components; and
  a simulation module configured to:
    apply boundary conditions representing strain on the textile swatch;
    apply force inputs representing audio output by the one or more audio components of the electronic-speaker device;
    simulate a vibroacoustic response of the textile swatch applied to the assembly model, the vibroacoustic response simulated based on the applied boundary conditions and force inputs; and
    identify, based on the simulated vibroacoustic response, frequencies that cause displacement of the textile swatch relative to surrounding areas sufficient for the textile swatch to vibrationally contact a component of the electronic-speaker device.

15. The system of claim 14, wherein the textile-characterization module is further configured to:
generate a time-temperature superposition (TTS) curve based on textile data, wherein the TTS curve includes storage moduli and corresponding frequencies usable to determine the elongation stiffness of the textile swatch over a particular frequency range.

16. The system of claim 14, wherein:
the textile-material model is applied to the assembly model to represent the textile swatch mounted on the electronic-speaker device; and
the simulation module is further configured to adjust the assembly model to remove constrained portions of the textile-material model and maintain unconstrained portions of the textile-material model within boundary conditions of the assembly model for modal analysis.

17. The system of claim 16, wherein the unconstrained portions of the textile-material model are modeled as solid bodies and represent portions of the textile swatch that are movable under structural vibration or air pressure.

18. The system of claim 16, wherein the constrained portions of the textile-material model represent portions of the textile swatch that are constrained by adhesive or other components of the electronic-speaker device.

19. A non-transitory processor-readable medium, comprising processor-readable instructions configured to cause one or more processors to:
determine textile-level properties of a textile swatch;
determine, using the textile-level properties, an elongation stiffness of the textile swatch in each of a course direction and a wale direction;
generate, based on the determined elongation stiffness of the textile swatch, a textile-material model of the textile swatch;
incorporate the textile-material model onto an assembly model representing an electronic-speaker device having one or more audio components;
simulate a vibroacoustic response of the textile swatch using the assembly model based on application of:
boundary conditions representing strain on the textile swatch; and
force inputs representing audio output by the one or more audio components of the electronic-speaker device;
identify, based on the simulated vibroacoustic response, frequencies that cause displacement of the textile swatch relative to surrounding areas sufficient for the textile swatch to vibrationally contact a component of the electronic-speaker device that is proximate to the textile swatch; and
storing the identified frequencies in association with the textile swatch.

20. The non-transitory processor-readable medium of claim 19, wherein the processor-readable instructions are further configured to cause the one or more processors to: generate a time-temperature superposition (TTS) curve based on results of a dynamic mechanical analysis performed on the textile swatch, wherein the TTS curve includes storage moduli and corresponding frequencies usable to determine the elongation stiffness of the textile swatch over a particular frequency range.

* * * * *